United States Patent

Stanton et al.

[11] Patent Number: 5,836,831
[45] Date of Patent: Nov. 17, 1998

[54] GOLF BALL

[75] Inventors: Lawrence E. Stanton, Stoughton; Walter L. Reid, Jr., Mattapoisett; Stephen K. Scolamiero, Bridgewater; Jeffrey L. Dalton, North Dartmouth, all of Mass.

[73] Assignee: Acushnet Company, Fairhaven, Mass.

[21] Appl. No.: 691,756

[22] Filed: Aug. 2, 1996

Related U.S. Application Data

[63] Continuation-in-part of Ser. No. 615,346, Mar. 11, 1996.

[51] Int. Cl.$^6$ ............................................. A63B 37/08
[52] U.S. Cl. .................................. 473/354; 473/358
[58] Field of Search ............................. 473/354, 358

[56] References Cited

U.S. PATENT DOCUMENTS

| | | |
|---|---|---|
| 3,098,658 | 7/1963 | Murphy . |
| 3,458,206 | 7/1969 | Kane et al. . |
| 3,490,770 | 1/1970 | Satchell . |
| 4,244,855 | 1/1981 | Cox et al. ............................. 273/231 |
| 4,904,320 | 2/1990 | Issac et al. ............................ 156/146 |
| 4,943,332 | 7/1990 | Sakaguchi et al. ................... 156/146 |
| 5,033,749 | 7/1991 | Kakiuchi et al. ..................... 273/227 |
| 5,150,906 | 9/1992 | Molitor et al. ....................... 473/354 |
| 5,253,871 | 10/1993 | Viollaz ................................. 473/374 |
| 5,439,227 | 8/1995 | Egashira et al. ................. 473/377 X |
| 5,467,994 | 11/1995 | Moriyama et al. ................... 473/354 |
| 5,624,332 | 4/1997 | Dalton et al. ......................... 473/354 |

FOREIGN PATENT DOCUMENTS

| | | |
|---|---|---|
| 247862 | 4/1992 | Japan . |
| 1049573 | 11/1966 | United Kingdom . |

*Primary Examiner*—George J. Marlo
*Attorney, Agent, or Firm*—Pennie & Edmonds LLP

[57] ABSTRACT

The present invention is directed towards the novel use of polyether-amide block copolymer to form center core shells for use in liquid filled golf balls. Wound golf balls of the present invention which employ liquid filled centers formed from polyether-amide block copolymer exhibit the same or superior in-play characteristics such as initial velocity as compared to conventional wound golf balls.

17 Claims, 1 Drawing Sheet ized to provide
GOLF BALL

This application is a continuation-in-part of U.S. patent application Ser. No. 08/615,346 filed Mar. 11, 1996.

FIELD OF INVENTION

This invention relates generally to golf balls having liquid filled centers. More particularly this invention relates to golf balls having a liquid filled center about which a length of elastic thread-like material is wound. Still more particularly, the present invention relates to materials for forming the hollow center of such golf balls which contains a liquid, solution, paste or gel.

BACKGROUND OF THE INVENTION

Currently, golf balls are generally classified based on their constructions as either a one-piece, two-piece or three-piece ball. The difference in play characteristics resulting from these different types of constructions can be quite significant. The one-piece ball typically comprises of a homogenous mass of polybutadiene, monomers, fillers, antioxidants, curing agents, and the like. These types of balls are generally inexpensive and durable, but do not provide superior distance or spin. Typically one-piece balls are manufactured for used as range balls or practice balls.

Often, it is desirable to select a relatively "hard" material such as an ionomer resin as the cover material so as to impart a high degree of durability to the golf ball. Two piece balls are made with a single solid core, usually made of a polymeric or crosslinked rubber material which is encased by a cover material. Typically the solid core is a high-energy acrylate or resin and is covered by a tough, cut-proof blended cover. The cover material can be made of any one of a number of conventional materials including ionomer resins such as SURLYN (Du Pont), or an elastomer. The combination of the core and cover materials provide a "hard" ball that is very durable. Further, such a combination imparts a high initial velocity to the ball which results in improved distance. Because these materials are very rigid, two piece balls have a hard "feel" when struck with a club. Likewise, due to their hardness, these balls have a relatively low spin rate which makes them difficult to control, particularly on shorter approach shots. Balls having a two piece construction are generally most popular with the average recreational golfer because they provide a very durable ball while also providing maximum distance.

Some three-piece balls are referred to as a "wound" ball due to their construction. Wound balls typically have either a solid rubber or hollow liquid center core around which many yards of a stretched elastic thread or yarn-like material is wound. Typically, the hollow liquid filled center core is made of a thermoset material such as a natural or synthetic rubber of blends thereof. The wound core is then covered with a durable cover material such as a SURLYN or similar material or a softer cover such as balata or polyurethane. Wound balls are the preferred ball of the more advanced players due to their superior spin and feel characteristics. Wound balls are generally softer and provide more spin, which enables a skilled golfer to have more control over the ball's flight. Moreover, as a result of their more complex structure, wound balls generally require a longer time to manufacture and are more expensive to produce than a two piece ball.

Initially, wound balls were manufactured having a solid center core. However, it was eventually discovered that wound balls with a liquid-filled center provided superior playing and "feel" characteristics. Accordingly, a number of methods for producing liquid filled centers are disclosed in the prior art. For example, in one method, a suitable liquid is encapsulated with a gelatin capsule to form a liquid filled sphere. This sphere is then frozen, covered with two preformed hemispherical rubber shells and placed in a heat mold and the rubber shells are vulcanized to provide adequate strength to the sphere so it can be used as a liquid filled center.

Another method includes placing a liquid or paste material into a spherical mold and freezing the material to form a solid core material. A non-vulcanized rubber coating is subsequently placed over the frozen sphere and vulcanized to form a rubber outer shell which retains the liquid material. A variation of this method is described in U.S. Pat. No. 3,490,770, wherein a spherical mold is filled with a liquid material which is convertible to a solid molecular structure by, e.g., thermosetting, polycondensation, catalytic conversion, or by other chemical conversion mechanisms. The mechanism for solidification is employed so as to provide a solid skin which encloses the remaining, unreacted liquid.

Still another method of creating a liquid filled center involves vulcanizing two rubber hemispheres and applying an adhesive to the outer "lip" of the hemispheres and assembling the two hemispheres to create a sphere and subsequently vulcanizing the sphere. Liquid is then injected into the sphere through the use of a hypodermic needle and the resulting puncture hole is sealed with a patch material such as urethane isocyanate. Alternatively, as described in U.S. Pat. No. 4,943,332, the hemispheres can be submerged in a desired liquid before the two halves are joined and either vulcanizing the sphere while submerged or upon removal from the liquid.

In one conventional commercial method of producing liquid centers for golf balls, the center is made from a natural rubber compound, wherein the base rubber material and other ingredients are mixed on an open mill. After the rubber stock is thoroughly mixed, the stock is placed in a calender which forms it into flat sheets. One sheet is placed into a die in which recessed cups are formed. A vacuum is placed on the die in order to pull the sheet into the cups.

A second sheet is then placed onto a vacuum die plate which opposes the first die. A small amount of water is sprinkled on top of the first sheet. The die assembly is then closed, pinching off bladders which consist of the two circular discs of rubber which are crimped at the edges and have a few drops of water trapped in the middle. The bladders are removed from the rubber sheets and placed in a mold which has hemispherical cavities defining the desired shape of the center. The mold is heated, causing the trapped water to turn to steam, which in turn inflates the bladders against the mold wall. Continued heating causes the rubber to vulcanize into the desired hollow shape.

Subsequently, the center is filled by puncturing it with a hypodermic needle and injecting a fluid of a controlled density. The needle is then removed and the center is washed to remove any excess filling solution. The hole is plugged with an adhesive material which crosslinks into a solid when exposed to ultraviolet light. At this point, the liquid filled center construction is complete and ready for the winding phase of the golf ball construction.

Very few suitable materials for use in the shell of the liquid filled center, especially for use in a wound ball, are disclosed in the prior art. For example, U.S. Pat. No. 4,943,332 discloses the use of conventional rubbers such as natural rubber, butadiene rubber, isoprene rubber or a mixed rubber thereof. Likewise, U.S. Pat. No. 4,904,320 teaches that the center shells or envelopes are usually made of a natural rubber. Additionally, U.S. Pat. No. 4,244,855 teaches a center core wall of a noncross-linked, butadiene-styrene radial block copolymer and a large portion of filler material. However, the natural rubber, synthetic rubber and blends thereof remain the industry standard as material for the liquid filled center shell.

U.S. Pat. Nos. 5,150,906 and 5,480,155 are both directed towards non-wound golf balls wherein a preformed shell rather than a preformed core is the starting point for the balls. In these inventions, a shell may be formed out of any number of materials, including a variety of thermoplastic materials. The shell may be the outer layer or may be slightly smaller than the final diameter of the ball and have a cover thereon. The shell is subsequently filled with a liquid material which can either remain a liquid or subsequently react to form a solid core.

Presently, the conventional process for producing a liquid filled center is rather complicated and labor intensive, requiring a number of distinct and separate process steps. For example, conventional processes typically require that the steps of milling, calendering, forming and molding the hollow center cores all be performed separately. Due to the complicated nature of the conventional processes, the manufacture of the liquid-filled centers is very time consuming and labor intensive. Accordingly, due to the large amount of labor and time involved, conventional liquid filled centers are relatively expensive to produce.

The difficulty in producing the conventional liquid filled centers is directly related to the conventional materials from which the center shells are typically made. As discussed above, natural and synthetic rubbers and blends thereof are overwhelmingly used in conventional liquid filled spheres. These materials are generally described as "thermosetting" materials, a term generally used to describe polymeric materials which solidify or "set" irreversibly when heated or exposed to radiation or a chemical reaction.

Thermosetting polymers consist of linear chains having numerous functional groups or double bonds distributed along the chains, which are capable of forming crosslinks on further polymerization reactions. This may occur upon exposure to heat or other radiation or by adding special catalysts, resulting in a three-dimensional network that makes the polymer infusible and insoluble. Since the crosslinks are strong covalent bonds that can only be broken at high temperatures at which the organic polymer would be completely decomposed, the thermosetting polymer, once it is fully crosslinked, is infusible and insoluble for all practical purposes; it cannot be remelted, remolded or dissolved.

Accordingly, a need exists for materials which are not thermosetting and are suitable for use as center core shell materials. Additionally, it would be desirable if the physical properties of the materials for use as center core shells were such as to facilitate a simplification the processes employed to produce the liquid filled golf ball center.

OBJECT OF THE INVENTION

An object of the present invention is the novel use of a variety of thermoplastic materials as center core shell materials in liquid filled wound golf balls.

Another object of the present invention is the novel use of a variety of thermoplastic materials as center core shell materials in liquid filled golf balls which have a solid layer or layers molded thereon.

SUMMARY OF THE INVENTION

The present invention is directed towards a variety of thermoplastic elastomers which are useful as center core shell materials in liquid filled golf balls. Liquid filled wound golf balls employing these thermoplastic materials provide the same or superior play characteristics as wound balls employing a conventional rubber based liquid filled center core.

However, the liquid filled centers of the present invention are not limited for use in conventional wound balls. To the contrary, it is contemplated that the liquid filled centers of the present invention are useful in "solid" golf balls which comprise one or more layers of a solid material molded around a liquid filled center core.

The present invention is also directed towards novel methods of sealing the liquid filled center core shells of the present invention. The novel sealing methods of the present invention provide more efficient methods for sealing liquid filled center core shells than those employed in the prior art.

DETAILED DESCRIPTION OF THE INVENTION

Figure 1:
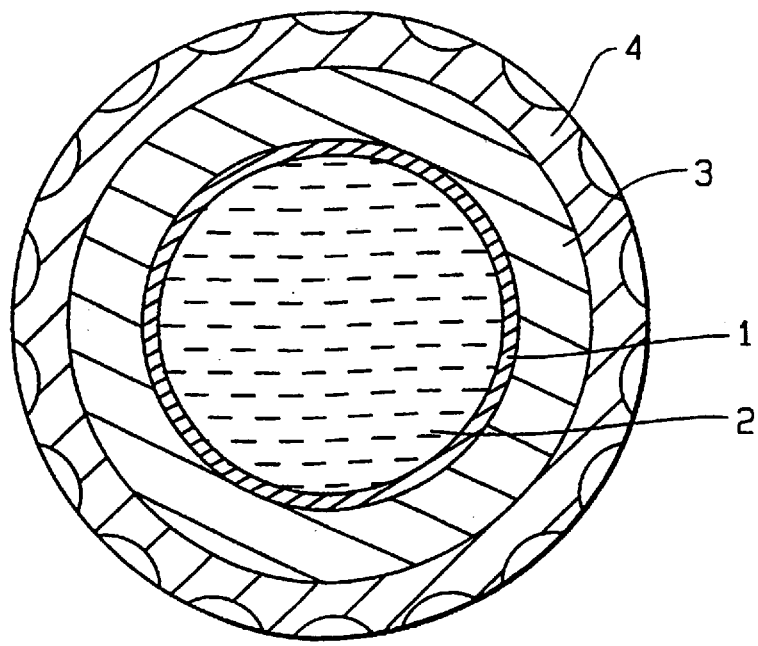
FIG. 1 is a cross-sectional drawing which illustrates one example of a thread wound ball in accordance to the present invention.

This invention is particularly directed towards liquid filled center core shells for use in golf balls. Specifically, the present invention is directed towards center core shell for a liquid filled center golf ball wherein the center core shell is formed from a thermoplastic material.

FIG. 1 provides an illustration of a cross sectional view of a thread wound golf ball according to one embodiment of the present invention. As illustrated in FIG. 1, the golf ball includes a hollow, spherical center core shell 1 having its hollow interior filled with a liquid 2. A thread rubber layer 3 is formed by winding rubber thread around the outer circumference of center core shell 1. A cover 4 encases the thread rubber layer 3. As used herein, the term thermoplastic means a linear polymer, either straight-chain or branch-chained macromolecules, that softens when exposed to heat and returns to its original condition when cooled to room temperature. The polymer can be heated and cooled repeatedly, as long as it is not heated above its decomposition point. This is because the polymer chains are held only by intermolecular forces that are relatively weak and permit easy movement and sliding of the chains under small temperature changes. As used herein, the term polymer means any type of polymer including random polymers, block polymers, graft polymers, etc.

The efficacy of thermoplastic materials for use in forming liquid filled centers has heretofore been unknown. Prior to the present invention, it was a general consensus in the golf ball art that a wound golf ball formed of a thermoplastic liquid filled sphere would exhibit inferior in-play characteristics such as decreased initial velocity as compared to conventional would golf balls formed using conventional liquid filled rubber "bags" or spheres. However, by the present invention, it has been now discovered that certain thermoplastic materials are suitable to provide a liquid filled center shell for golf balls. Golf balls made with these shells exhibit equal, and for some thermoplastic materials, even better in-play characteristics than conventional balls having liquid filled rubber center shells.

A large number of thermoplastic polymeric materials are contemplated as being useful in the center core shells of the present invention. The thermoplastic materials may be employed alone or in blends. Suitable thermoplastic materials include but are not limited to rubber modified polyolefins, metallocene, polyether-ester block copolymers, polyether-amide block copolymers, thermoplastic based urethanes, copolymers of ethylene with butene and maleic anhydride, hydrogenated maleic anhydride, polyester polycaprolactone, polyester polyadipate, polytetramethylene glycol ether, thermoplastic elastomer, polypropylene, vinyl, chlorinated polyether, polybutylene terephalate, polymethylpentene, silicone, polyvinyl chloride, thermoplastic polyurethane, polycarbonate, polyurethane, polyamide, polybutylene, polyethylene and blends thereof.

Preferred thermoplastic materials include rubber modified polyolefins, metallocenes, polyether-amide block copolymers and polyether-ester block copolymers. Preferred rubber modified polyolefins are commercially available under the tradenames Vistaflex (Advanced Elastomer Systems), Kraton (Shell), Hifax (Montell), X1019-28 (M. A. Hanna), Sarlink (DSM), and Santoprene (Advanced Elastomer Systems). Preferred metallocenes are available from Dow Corporation under the tradenames Engage and Affinity. Preferred polyether-amide block copolymers are available under the tradename Pebax (EIG Auto-Chem). Preferred polyether-ester block copolymers are commercially available from DuPont under the tradename Hytrel.

The thermoplastic center core shells of the present invention may also comprise of a suitable filler material in order to adjust the properties of the finished center core shell. For example, the specific gravity or density of the center core shell may be adjusted by the addition of a suitable material, such as barium sulfate, zinc oxide, calcium carbonate, titanium dioxide, carbon black, kaolin, magnesium aluminum silicate, silica, iron oxide, glass spheres and wollastonite. The filler material may be present in any amount that will adjust the specific gravity of the center core shell. Such filler material may range from about 5 percent by weight to about 70 percent by weight. More preferably, the filler material is present in an amount less than about 45 weight percent.

Additionally, the thermoplastic center core shells of the present invention may also be comprised of a suitable plasticizer or other material in order to improve the processability and physical properties such as the flow properties of the thermoplastic materials. Plasticizers conventionally known in the art are contemplated as being suitable for use in the present invention. It is desirable that the thermoplastic center core shells of the present invention have a melt index of about 1 gm/min. to about 52 gm/min. Preferably, the thermoplastic center core shell has a melt index of about 1.5 gm/min. to about 15 gm/min. The plasticizer may be present in any amount that will adjust the flow properties of the center core shell materials.

The center core shells of the present invention preferably have a wall thickness of about 0.010 inches to about 0.500 inches. The thickness of the center core shell walls typically correlates but is not necessarily limited to the manner in which the shell is produced. For example, the walls of center core shells produced by a blow molding type of process generally are thinner than those produced by other molding processes such as by injection molding. The preferred thickness for the center core shell wall will likely vary depending upon the performance requirements desired.

Additionally, the method of manufacture will affect other physical characteristics of liquid filled golf ball centers of the present invention.

For example, in a preferred embodiment of the present invention, the wall of the spherical core has a uniform thickness throughout. Such uniform thickness will result from the use of an injection molding method, such as the one described below to form the spherical core. This uniform thickness provides a beneficial contribution to a variety of in-flight characteristics of golf balls made with such cores including improved distance, accuracy and spin rate. Other molding methods for golf ball cores typically produce cores that are, to varying degrees, of a non-uniform thickness and as a result may be out-of-round, thereby adversely affecting the ball's in-flight characteristics.

In another embodiment of the present invention, the liquid filled center comprises a seamless spherical core shell. Such seamless core shells can be formed by one of the blow molding processes discussed in detail below.

As discussed above, the present invention is directed towards a liquid filled golf ball center which comprises a center core shell formed from a thermoplastic material which is filled with a liquid. A number of the characteristics such as spin rate, initial velocity and "feel" of golf balls in which the present liquid filled centers are incorporated are affected by the physical properties of both the core shell material, core shell diameter and thickness, as well as the liquid employed to fill the shell. Accordingly, parameters for a number of physical properties of the core shell and liquid therein are considered to be important in optimizing the various play characteristics.

For example, the center core shells of the present invention preferably have a hardness of about 20 Shore A to 80 Shore D. More preferably, the center core shells of the present invention have a Shore hardness about 50 to 85 Shore A. Likewise, the center core shells of the present invention preferably have a flexural modulus of about 500 psi to about 70,000 psi. More preferably, the center core shells of the present invention have a flex modulus of about 3000 psi to about 10,000 psi.

Further, the center core shells of the present invention preferably have a specific gravity of about 0.70 to about 3.0. More preferably the specific gravity of the center core shell is about 0.80 to about 2.2.

The liquid employed to fill the core shells preferably has a specific gravity of about 1.0 to about 1.6. More preferably, the liquid has a specific gravity of about 1.10 to about 1.56. The center core shells of the present invention may be filled with any number of suitable liquids. Examples of suitable liquids include water, salt solutions such as sodium bromide, potassium iodide and the like, gel, viscous fluids, alcohol or combinations thereof. Preferred liquids are salt solutions. Preferably, the liquids have a pH of between about 4.0 and 8.0, a freezing point above about 50° F. and a specific gravity of between about 1.0 and about 1.56 g/cm$^3$.

The liquid filled center core skills of the present invention may be produced using any one of several methods. In particular, these methods exploit the beneficial physical properties of thermoplastic materials in order to provide more efficient and cost effective methods for producing liquid filled center golf balls.

One method for producing the center core shells of the present invention is by an extrusion blow molding process. In an extrusion blow molding process, a continuous tube or parison of a thermoplastic polymeric material is extruded by a conventional extrusion process, preferably in a downward direction. Typically, the parison weighs between about 2 to about 80 grams depending upon cavitation. The plastication temperature of the thermoplastic materials employed in this method is generally about 250° F. to about 600° F. The parison is introduced to two mold halves which form a spherical mold such that one end of the parison, preferably the bottom end, is fixed in the mold, wherein that end of the parison is crimped or pinched off, thereby closing one end of the parison.

A means for introducing an inflating medium, such as a needle, blow pin or pipe, is inserted or otherwise presented to the open end of the parison in order to inflate the parison. A sufficient amount of inflating medium such as pressurized or compressed air is introduced through the blowing pin so as to inflate the parison against the walls of the mold, thereby forming a seamless spherical core shell. The blow pressure is generally about 5 psi to about 200 psi. The blow pressure is applied to the parison for about 1 second to about 15 seconds. The appropriate blow pressure will vary depending on such factors as the thermoplastic material employed, the desired thickness of the shell wall, the overall diameter of the shell, etc. Center core shells produced by this embodiment of the present invention preferably have a wall thickness of about 0.005 inches to about 0.125 inches and an overall diameter of up to about 1.580 inches, but preferably less than 1.25".

Co-extrusion blow molding is another method of forming the center core shells of the present invention. Co-extrusion blow molding is similar to the process described above, but wherein a parison is extruded comprising two or more layers of either similar materials or dissimilar materials, e.g., HDPE/Regrind PE/HDPE; PP/Adhesive EVOH/Adhesive/PP; PET/Recycled PET. The different layers may be employed to impart differing mechanical properties.

Still another method of forming the center core shells of the present invention is by an injection blow molding process. In an injection blow molding process, a "shot" of thermoplastic polymeric material is injected into a closed preform mold cavity that contains a blow pin in its center such that the melted thermoplastic material fills the void between the preform cavity and the blow pin. The weight of the shot is typically about 1 to about 80 grams depending on cavitation. The thermoplastic materials employed in this embodiment of the present invention have a plastication temperature of about 200° F. to about 600° F. The material is injected into the preform mold at about 20 psi to about 1800 psi (hydraulic pressure).

The preform mold is then opened and the blow pin now holding an injection molded parison is transferred to the blow mold. Preferably, the blow mold has a spherical shape. A sufficient amount of an inflating medium such as compressed or pressurized air is introduced to the center of the thermoplastic mass through the blow pipe so as to inflate and cool the thermoplastic mass against the walls of the blow mold, thereby forming a seamless spherical core shell. As a result of such seamless characteristic, no secondary operations are required to bond parts together. Typically, the pressure of the inflating medium is about 10 psi to about 200 psi, and the blow time is about 0.05 seconds to about 15 seconds.

Another method of forming the center core shells of the present invention is by an injection molding process. In an injection molding process, the thermoplastic polymeric material is injected into a closed mold to form a hemispherical shell. The thermoplastic materials employed in this process typically have a plastication temperature of about 200° F. to about 600° F.

The thermoplastic material is injected into the mold at about 30 psi to about 2,000 psi (hydraulic pressure). As is well known in the injection molding art, the injection molding process may include multiple stages which have different pressures and are held at each pressure for different periods of time. The hemispherical shells are removed from the mold and bonded to form a spherical core shell. The hemispherical shells have a wall thickness of about 0.010 inches to about 0.5 inches and a diameter of about 0.125 inches to about 1.5 inches. This injection molding process provides center core shells having a uniform wall thickness.

The hemispherical shells formed can be bonded together through a variety of methods. For example, the two hemispheres can be joined by hot plate welding. In this method, the two hemispheres are presented to a hot plate under pressure in order to melt the contact surface. After contacting the hot plate surface, the two hemispheres are brought into contact in order to fuse the melt surfaces together. Typically, the temperature of the hot plate surface which is brought into contact with the thermoplastic is about 250° F. to about 750° F. Preferably, the hot plate temperature is about 350° F. to about 550° F. The contact pressure is generally about 10 psi to about 100 psi, preferably about 40 psi to about 60 psi. The weld time required to fuse the melt surfaces is typically 1 second to about 30 seconds, preferably about 4 seconds to about 12 seconds. Non-contact heat sealing methods such as the use of radiant heat sources or hot air convection can also be employed to melt the contact surfaces.

Another method of joining the thermoplastic hemispheres is by spin welding. In this method, one of the hemispheres is rotated at high RPM and then its outer rim is brought into contact with the outer rim of a second hemisphere. The resulting friction generates a sufficient amount of heat to melt the polymer at the contact surface and form a satisfactorily bonded interface. Typically, one of the hemispheres is rotated at about 2,000 to about 20,000 RPM. The other hemisphere is placed against the rotating hemisphere for about 1 to about 15 seconds at a contact pressure of about 10 to about 200 psi.

The thermoplastic spherical core shell of the present invention may also be formed by joining two hemispherical shells by any number of other means such as chemical bonding, thermal impulse welding, vibrational welding, ultrasonic welding, electromagnetic welding, tack welding, RF heat sealing, induction bonding, hot wire seaming, co-injection molding, or hot melt sealing.

The center core shells of the present invention can be filled with a liquid by a number of methods. In one such method, the spheres are filled with a liquid using the conventional method discussed earlier wherein the center is punctured with a hypodermic needle, injected with a fluid and the resulting hole is plugged with a thermally curable adhesive, a UV curable adhesive, a solvent or water based paint, a hot melt adhesive or a polymeric material.

In a preferred method, the liquid is introduced via a coaxial needle. Preferably, a vacuum of about 28.0 to about 28.5 inches Hg is formed inside the core shell using one channel of the coaxial needle. The vacuum is used to draw the liquid into the sphere. After all of the liquid has been injected into the center, the puncture is cauterized with a hot rod, whereby molten material is introduced to the cauterized area and pressed with a rod to form an integral seal.

In another method, the centers are filled with a liquid by joining the hemispheres together while the hemispheres are submerged in a bath of such liquid. In this method, the hemispheres may be spin welded or otherwise bonded together while submerged in the liquid, thereby trapping the liquid inside the joined hemispheres to form a liquid filled center. This mode of filling the spheres is desirable in that it eliminates the need for patching or plugging any holes in the walls of the center.

In still another method, the center is filled by introducing the liquid through an inlet means which was integrally formed in a hemisphere or in the seamless centers during the molding thereof. Such centers can be made by any of the processes discussed above. In this embodiment of the invention, the mold provides for an inlet means such as an aperture or hole through the wall of the hemisphere or seamless sphere. The center is filled with a liquid through this hole and then the hole is heat sealed by melting the thermoplastic material around it, causing the material to flow into the hole, sealing it. The thermoplastic may be melted using any conventional techniques such as hot air or hot plate (thermostaking) methods. A preferred method of sealing the spheres is blowing hot air on the inlet means and subsequently cold staking the molten material around the inlet means. These heat sealing methods may be employed to seal any of the other embodiments of the center core shells of the present invention.

Preferably, the inlet means comprises a protruded portion of thermoplastic material which extends from the outer surface of the center core shell such that upon heat sealing, only this portion of thermoplastic material melts and flows into the hole, sealing the sphere.

The center core shells of the present invention are typically employed in a golf ball having a "three-piece" or "wound" construction. However, center core shells of the present invention may also be employed in solid golf balls which comprise a center core shell around which one or more layers of a solid material are molded thereon. Likewise, the present invention also contemplates a golf ball which is formed of a center core upon which a cover is directly molded or formed.

Without further elaboration, it is believed that one of ordinary skill in the art can, using the preceding description, utilize the present invention to its fullest extent. The following examples are merely illustrative and in no manner is the present invention limited to the specific disclosures therein.

EXAMPLE 1

In this example, the center core shells were formed by the method described below. Engage 8200, a metallocene material commercially available from Dow, was injection blow molded to form spheres. The spheres were formed using a multi-zoned, multi-staged 85 ton Jomar, vertical screw injection blow molding machine having a single spherical cavity mold. The temperature profile of the zones and the pressures for each stage are illustrated in Tables 1 and 2 respectively. Additional process parameters are given in Tables 3 and 4.

TABLE 1

| Zone 1: | 170° C. |
|---|---|
| Zone 2: | 170° C. |
| Zone 3: | 170° C. |
| Zone 4: | 170° C. |
| Zone 5: | 180° C. |
| Parison Shank: | 125° C. |
| Parison Neck: | 110° C. |
| Parison Center: | 125° C. |
| Parison Bottom: | 225° C. |

TABLE 2

| | (Hydraulic Pressure) |
|---|---|
| Injec. press: | 190 psi |
| 1st blow press: | 120 psi |

TABLE 3

| Cycle time: | 9.7 sec. |
|---|---|
| Blow: | .55 sec. |
| Preform delay: | 1.0 sec. |
| Preform (LP): | 3.0 sec. |
| Cure time: | 3.5 sec. |
| Decompress time: | 0.6 dec. |
| Blow air delay: | 1.0 sec. |
| 1st Blow air: | 6.5 sec. |

TABLE 4

| Shot Weight: | 2.03 grams |
|---|---|
| Screw Forward: | 45 RPM |
| Screw Reverse: | 35 RPM |
| Screw Press.: | 1300 psi |
| Cooling Time: | 28 s |
| Recovery Time: | 6 s |

These spheres or center core shells were then filled with a liquid mixture of potassium carbonate and water, wherein such mixture had a specific gravity of about 1.56 gm/cc. The center core shells were filled through a preformed inlet hole having a portion of thermoplastic material protruding from the surface of the shell, then sealed with a hot air, cold staking process. The liquid filled center core shells were then used to form a wound golf ball using conventional manufacturing methods and tested for a variety of play characteristics.

EXAMPLE 2

In this example, the center core shells were formed by the following method. Engage 8150, a metallocene material commercially available from Dow was extrusion blow molded to form a sphere. The spheres were formed using a multi-zone Battenfeld FHB 106-2 80/24D extruder with high output screw having a single mold cavity and a S1-35-T-PE head. The temperature profile of the zones and process parameters are illustrated below in Table 5 and Table 6.

TABLE 5

| Zone 1: | 350° F. |
|---|---|
| Zone 2: | 350° F. |
| Zone 3: | 350° F. |
| Zone 4: | 350° F. |
| Zone 5: | 350° F. |
| Zone 6: | 350° F. |
| Zone 7: | 350° F. |
| Zone 8: | 350° F. |
| Zone 9: | 350° F. |

TABLE 6

| Heading Tooling: | 30 mm diverging |
|---|---|
| Blow Time: | 7 s |
| Vent Time: | 8 s |

TABLE 6-continued

| | |
|---|---|
| Extruder Speed: | 2 RPM |
| Melt Temp: | 310° F. |

The spheres or center core shells were subsequently filled with a mixture of potassium carbonate and water, wherein the mixture had a specific gravity of about 1.56 gm/cc. The center core shells were filled through a preformed inlet hole having a portion of thermoplastic material protruding from the shell, then sealed with a hot air, cold staking process. The liquid filled center core shells were then used to form a wound golf ball using conventional manufacturing methods and tested for a variety of play characteristics.

EXAMPLE 3

In this example, the center core shells were formed by the following method. Vistaflex 671-N, a rubber modified polyolefin, commercially available from Advanced Elastomer Systems was extrusion blow molded to form a sphere. The spheres were formed using a multi-zone Battenfeld FHB 106-2 80/24D extruder with high output screw having a single mold cavity and a S1-35-T-PE head. The temperature profile of the zones and other process parameters are illustrated below in Table 7 and Table 8.

TABLE 7

| | |
|---|---|
| Zone 1: | 300° F. |
| Zone 2: | 310° F. |
| Zone 3: | 310° F. |
| Zone 4: | 310° F. |
| Zone 5: | 310° F. |
| Zone 6: | 310° F. |
| Zone 7: | 310° F. |
| Zone 8: | 310° F. |
| Zone 9: | 310° F. |

TABLE 8

| | |
|---|---|
| Head Tooling: | 30 mm diverging |
| Blow Time: | 7 s |
| Vent Time: | 8 s |
| Extruder Speed: | 2 RPM |
| Melt Temp: | 310° F. |

The shot weight was about 30 grams. The resulting sphere had a weight of about 4.1 grams and a wall thickness of about 0.025 to about 0.04 inches.

The spheres or center core shells were subsequently filled with a mixture of potassium carbonate and water, wherein the mixture had a specific gravity of about 1.56 gm/cc. The center core shells were filled through a preformed inlet hole having a portion of thermoplastic material protruding from the shell, then sealed with a hot air, cold staking process. The liquid filled center core shells were then used to form a wound golf ball using conventional manufacturing methods and tested for a variety of play characteristics.

EXAMPLE 4

In this example, the center core shells were formed by the method described below. Vistaflex 671-N, a rubber modified polyolefin, commercially available from Advanced Elastomer Systems was injection molded to form hemispheres. The hemispheres were formed using a multi-zoned, 85 ton Cincinnati injection molding machine having dual cavity hemispherical molds with flat bonding surfaces. The temperature profile, pressures and other process parameters are illustrated in Tables 9 and 10 below.

TABLE 9

| | |
|---|---|
| Temperatures: | |
| Rear Zone: | 300° F. |
| Center Zone: | 350° F. |
| Front Zone: | 360° F. |
| Nozzle: | 370° F. |
| Mold Moving: | 115° F. |
| Mold Fixed: | 55° F. |
| Pressures: | (Hydraulic) |
| Fill: | 724 psi |
| Pack: | None |
| Hold: | 100 psi |
| Back: | — |

TABLE 10

| | |
|---|---|
| Timers: | |
| Boost: | 5 s |
| Pack: | None |
| Hold: | 3.0 s |
| Cooling: | 30 s |
| Shot Size: | 1.25 in |
| Cushion: | 0.28 in |
| Screw RPM: | 170 @ 50% |
| Ram Velocity: | 10. in/sec. |

The hemispheres were subsequently joined to form a sphere using hot plate or spin welding processes. These spheres or center core shells were then filled with a liquid mixture of potassium carbonate and water, wherein such mixture had a specific gravity of about 1.56 gm/cc. The center core shells were filled through a preformed inlet hole having a portion of thermoplastic material protruding from the surface of the shell, then sealed with a hot air, cold staking process. The liquid filled center core shells were then used to form a wound golf ball using conventional manufacturing methods and tested for a variety of play characteristics.

EXAMPLE 5

In this example, the center core shells were formed by the method described below. Affinity PF 1140, a metallocene available from Dow, was injection molded to form hemispheres. The hemispheres were formed using a multi-zoned, multi-staged 83 ton Arburg injection molding machine, having a dual cavity hemispherical molds with flat bonding surfaces. The temperature profile of the zones and the pressures for each stage are illustrated in Tables 1 and 2 respectively.

TABLE 1

| | |
|---|---|
| Feed Zone: | 90° F. |
| Zone 1: | 390° F. |
| Zone 2: | 400° F. |
| Zone 3: | 405° F. |
| Nozzle: | 400° F. |
| Platens: | 50° F. |

TABLE 2

|  | (Hydraulic Pressure) |
| --- | --- |
| 1st stage: | 390 psi |
| 2nd stage: | 370 psi |
| Injection: | 554 psi |
| Holding: | 380 psi |
| Back: | 45 psi |

TABLE 3

| Mold Temps: | |
| --- | --- |
| Stationery: | 50° F. |
| Moving: | 50° F. |
| Shot Size: | 32 mm |
| Cushion: | 5 mm |

TABLE 4

| Shot Weight: | 7.9 grams |
| --- | --- |
| Screw RPM: | 75 |
| Fill Time: | 0.68 s |
| Hold Time: | 6.1 s |
| Cooling Time: | 28 s |
| Recovery Time: | 6 s |

The hemispheres were subsequently joined to form a sphere using either a hot plate or a spin welding process. These spheres or center core shells were then filled with a liquid mixture of potassium carbonate and water, wherein such mixture had a specific gravity of about 1.56 gm/cc. The center core shells were filled through a preformed inlet hole having a portion of thermoplastic material protruding from the surface of the shell, then sealed with a hot air, cold staking process. The liquid filled center core shells were then used to form a wound golf ball using conventional manufacturing methods and tested for a variety of play characteristics.

EXAMPLE 6

Table 11 below provides the PGA, the velocity, the Driver spin rate and the 8 iron spin rate for wound golf balls made using the liquid filled centers described above in Examples 1–6 and constructed using conventional manufacturing methods. This data was gathered using a True Temper Hitting machine, a Titleist Portable Launch Monitor (PLM) and an Atti Compression Test Machine equipped with a Federal Dial Gauge Model 081-C.

TABLE 11

| Center Core Shell Material | Center Molding Process | Compression PGA | Finished Ball Velocity (FSP) | Driver Launch Angle | Driver Spin Rate (RPM) | 8 Iron Launch Angle | 8 Iron Spin Rate (RPM) |
| --- | --- | --- | --- | --- | --- | --- | --- |
| Control Tour Balata 100 (Thermoset Rubber) | Compression | 86 | 252.52 | 8.8 | 3879 | 18.4 | 9301 |
| Vistaflex 671-N | Injection | 92 | 254.20 | 9.0 | 4007 | 18.6 | 9505 |
| Affinity PF 1140 | Injection | 96 | 252.77 | 9.0 | 3910 | 1.86 | 9387 |
| Engage 8150 | Extrusion Blow Molded | 87 | 254.05 | 9.0 | 3906 | 18.9 | 9260 |
| Vistaflex 671-N | Extrusion Blow Molded | 88 | 253.82 | 9.0 | 3931 | 19.0 | 9322 |
| Engage 8200 | Injection Blow Molded | 94 | 255.65 | 8.9 | 3975 | 18.3 | 9564 |

EXAMPLE 7

In this example, a number of center core shells were formed from a variety of thermoplastic materials. The thermoplastic materials were injection molded mixed with either zinc oxide or barium sulfate to adjust specific gravity in accordance with the methods of the present invention to form a sphere. The spheres or center core shells were subsequently filled with a mixture of potassium carbonate and water, wherein the mixture had a specific gravity of about 1.56 gm/cc. The center core shells were filled through a preformed inlet hole having a portion of thermoplastic material protruding from the surface of the shell, then sealed with a hot air, cold staking process. The liquid filled center core shells were then used to form a wound golf ball using conventional manufacturing methods.

The finished golf balls were then tested for a variety of play characteristics using a True Temper Hitting Machine, a Titleist Portable Launch Monitor (PLM) and an Atti Compression Test Machine equipped with a Federal Dial Gauge Model D81-C. Table 12 below provides the PGA, the velocity, the driver spin rate, the 5 iron spin rate and the 8 iron spin rate for these golf balls.

TABLE 12

| Material | PGA | Velocity (FPS) | Driver Spin (RPM) | Driver Launch Angle | 5 Iron Spin (RPM) | 5 Iron Launch Angle | 8 Iron Spin (RPM) | 8 Iron Launch Angle |
|---|---|---|---|---|---|---|---|---|
| Santoprene 201-55 | 97 | 253.6 | 3845 | 9.0 | 7568 | 12.2 | 9381 | 18.5 |
| Pebax 3533 | 98 | 254.4 | 3743 | 9.0 | 7515 | 12.1 | 9350 | 18.5 |
| Kraton 7720 | 96 | 252.8 | 3890 | 9.0 | 7504 | 12.1 | 9352 | 18.5 |
| Kraton 7722 | 96 | 252.2 | 3795 | 9.0 | 7478 | 11.9 | 9316 | 18.6 |
| Hifax X-26 | 99 | 251.4 | 3743 | 9.0 | 7383 | 12.1 | 9300 | 18.6 |
| M. A. Hanna X-28 | 96 | 254.0 | 3840 | 9.1 | 7426 | 12.1 | 9293 | 18.5 |
| Sarlink 3150 | 96 | 252.7 | 3919 | 9.2 | 7449 | 12.2 | 9384 | 18.6 |
| Dow Metallocene | 97 | 253.5 | 3677 | 9.1 | 7310 | 12.2 | 9299 | 18.6 |
| Thermoset Rubber (Control) | 93 | 253.7 | 3718 | 9.0 | 7173 | 12.0 | 9195 | 18.2 |

I claim:

1. A wound golf ball comprising:
   (a) a liquid filled center;
   (b) a layer of windings surrounding said liquid filled center; and
   (c) a cover
wherein said liquid filled center comprises a center core shell, said center core shell comprising a polyether-amide block copolymer and having a seal on a portion of the outer surface thereof.

2. The golf ball of claim 1, wherein the center core shell comprises a seamless sphere.

3. The golf ball of claim 1, wherein the center core shell has a uniform wall thickness.

4. The golf ball of claim 1, wherein the center core shell has a specific gravity of about 0.70 to about 3.0 gm/cc.

5. The golf ball of claim 1, wherein the center core shell has a flex modulus of about 3,000 psi to about 10,000 psi.

6. The golf ball of claim 1, wherein the center core shell has a hardness of about 50 to about 85 Shore A.

7. The golf ball of claim 1, wherein the liquid comprises a salt solution.

8. The golf ball of claim 7 wherein the liquid comprises a sodium bromide solution or a potassium iodide solution.

9. The golf ball of claim 7, wherein the liquid has a specific gravity of from about 1.0 to about 1.56 gm/cm$^3$.

10. The golf ball of claim 1, wherein the seal is formed by melting a portion of the center core shell.

11. The golf ball of claim 1, wherein the center core shell further comprises a filler material, said filler material being present in an amount of from about 5 to about 70 percent by weight.

12. The golf ball of claim 11, wherein the filler material is barium sulfate, zinc oxide, carbon black, kaolin, magnesium aluminum silicate, silica, iron oxide, glass spheres or wollastonite.

13. The golf ball of claim 1, wherein the center core shell further comprises a filler material, said filler material being present in an amount of less than about 45 percent by weight.

14. The golf ball of claim 1, wherein the center core shell further comprises a plasticizer.

15. The golf ball of claim 1, wherein the center core shell has a specific gravity of from about 0.80 to about 2.20.

16. The golf ball of claim 1, wherein the center core shell has a diameter of less than about 1.25 inches.

17. A wound golf ball comprising:
   (a) a liquid filled center;
   (b) a layer of windings surrounding said liquid filled center; and
   (c) a cover
wherein said liquid filled center comprises a center core shell, said center core shell consisting essentially of a polyether-amide block copolymer and having a seal on a portion of the outer surface thereof.

* * * * *

UNITED STATES PATENT AND TRADEMARK OFFICE
CERTIFICATE OF CORRECTION

PATENT NO. : 5,836,831

DATED : November 17, 1998

INVENTOR(S) : Stanton et al.

It is certified that error appears in the above-identified patent and that said Letters Patent is hereby corrected as shown below:

On the title page of the patent, in "[75] Inventors:", after "Jeffrey L. Dalton, North Dartmouth", please add:

--Murali Rajagopalan, South Dartmouth--

Signed and Sealed this

Fourth Day of May, 1999

Attest:

*Attesting Officer*

Q. TODD DICKINSON

*Acting Commissioner of Patents and Trademarks*